United States Patent Office 3,809,579
Patented May 7, 1974

---

3,809,579
METHOD FOR PRODUCING LEAD OXIDE CONTAINING ANTIMONY, LEAD OXIDE MADE BY THE METHOD, AND A STORAGE BATTERY ELECTRODE USING THE OXIDE
C. Joseph Venuto, Philadelphia, Pa., assignor to ESB Incorporated
Original application Oct. 27, 1971, Ser. No. 192,947, now Patent No. 3,723,182. Divided and this application Nov. 16, 1972, Ser. No. 306,981
Int. Cl. H01m 35/02
U.S. Cl. 136—26
4 Claims

ABSTRACT OF THE DISCLOSURE

A storage battery positive electrode is disclosed having a grid structure without antimony and a paste containing a small controlled quantity of antimony therein. Methods of preparation of the antimony containing oxide by the use of conventional lead oxide producing equipment is also described.

---

This is a division of application Ser. No. 192,947, filed Oct. 27, 1971, now Pat. No. 3,723,182.

BACKGROUND OF THE INVENTION (1) Field of the invention

This invention relates to lead acid storage batteries. In particular, it relates to a lead oxide composition for use with certain non-antimony containing grid structures and methods of preparation.

(2) Description of the prior art

The material from which the internal structural parts of lead acid storage batteries are made has classically been lead containing more or less antimony. The antimony adds strength and hardness to the otherwise soft lead. It makes it easier to weld and has other useful properties. It is also well recognized that the antimony is a poison to the negative plate and can accelerate the self-discharge and reduce the charge voltage of the negative plate.

It has been found in service that antimony dissolves from the positive plate grid, diffuses through the positive active material and then deposits on the negative plate. Deterioration of the negative plate commences with the arrival of antimony from the positive plate. In storage battery manufacture every effort is made to preserve the purity of both positive and negative pastes (from which the active materials are formed) and particularly, they are kept free of antimony.

For certain classes of battery, particularly those designed for maximum life and where the batteries ordinarily do not undergo much electrical cycling, it has been found desirable to omit the antimony from the structural members and thus prevent deterioration of the negative plate. In some of these non-antimony type cell constructions, other metals, particularly calcium, has been added to the lead as a strengthening agent. In others, pure lead alone is used.

It has been found that the cycle life of cells built without antimony is distinctly inferior to the cycle life of cells built with antimony containing ingredients. It has recently been found that when antimony is added to the battery paste there is a considerable improvement in cycle life. Further, it has been found that when non-antimony lead cells are deeply discharged. It is sometimes impossible to recharge the cells, or else that the recharge requires an excessively high voltage. A study of this phenomenon has disclosed that the presence of antimony in the positive plate enables the deeply discharged plates to be recharged without difficulty. Careful studies suggest that the antimony enters into the crystal structure of the positive active material, giving the above desirable results.

In recent years, the supply of antimony has become very uncertain and its price has increased greatly. This also is an incentive to reduce the antimony content of lead acid storage cells.

SUMMARY OF THE INVENTION

A positive electrode for a storage battery is disclosed having a non-antimony grid and an active material containing antimony. The antimony in the active material is carefully controlled at a low value.

A second aspect of the invention is a method for preparing battery grade lead oxide containing a small controlled quantity of antimony by the oxidation of lead antimony alloy making use of conventional lead oxide conversion equipment.

Batteries built with positive electrodes made in accordance with this invention have been shown to be free of the defects usually associated with non-antimony lead grids including ability to accept charge at any stage of discharge, improved capacity and cycle life equal to that of batteries having antimonial lead grids. By the use of the invention, the antimony requirements for an acceptable battery are reduced to a fraction of the requirements for a battery having lead antimony alloy grids. This results in a considerable saving to the battery purchaser, i.e. the general public.

DESCRIPTION OF THE PREFERRED EMBODIMENT

Figure 1:
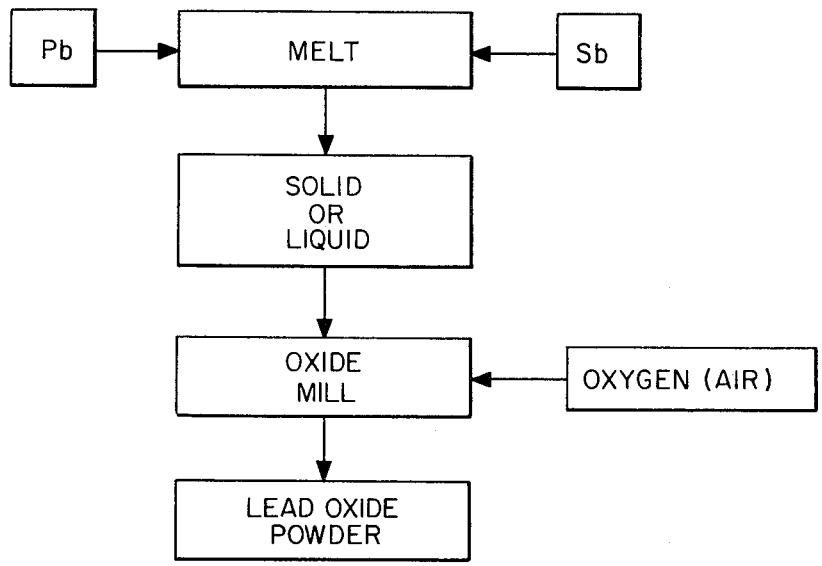
FIG. 1 depicts in block form a flow diagram for the manufacture of an antimony-lead oxide material.

In FIG. 1, a flow diagram is shown. Lead and antimony are fed to a melting furnace in which a lead antimony alloy is prepared having the desired ratio of antimony to lead. Lead is taken from this furnace either as a liquid or cast into suitable shapes to feed a lead oxide mill. Any of the known lead oxide manufacturing devices can be employed, each type tending to produce its own particular variation of lead oxide. Thus, there are the ball mill types in which pieces of lead are ground against each other in the presence of air to produce a grey oxide having a high content of unoxidized lead. This material may be broken up further by treatment in a hammer mill.

A second general type of lead oxide producing device is known as the Barton pot. In this device, a draft of air is forced down upon the surface of a pool of molten lead forming lead oxide. As the lead oxide forms, it is drawn off and additional liquid lead is added to maintain the pool. Refinements in this device include the degree and type of agitation imparted to the lead surface, operating temperatures controls, etc. The product of this sort of furnace has a high degree of oxidation and is in the form of a very fine powder.

A third method of preparing lead oxide from lead is the roasting process in which lead is heated and rabbled as in a reverbratory furnace. With this form of equipment, red leads ($Pb_3O_4$) as well as litharges (PbO) can be produced.

The lead oxide so produced has a very uniformly distributed antimony content of the same value as the antimony content of the original alloy. It is believed to have the antimony bound in a molecular array with the lead and oxygen. This is believed to differ considerably from a mechanical mixture of preformed lead oxide and antimony oxide. It is also believed that the antimony as treated by the process of the invention is molecularly dispersed. Whereas, in a mixture, the particles of antimony oxide will be found to contain a great many antimony atoms.

Figure 2:
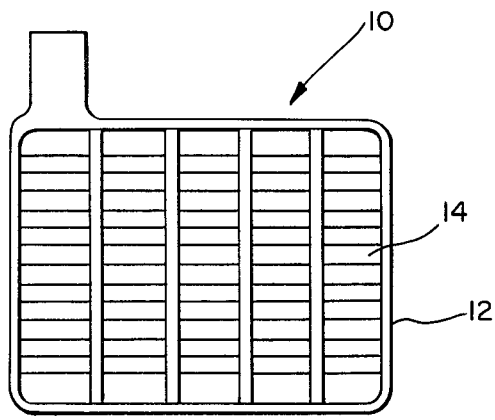
FIG. 2 illustrates a battery plate made in accordance with the invention.

In FIG. 2, a typical positive battery plate 10 made in accordance with the invention is shown. A metallic grid 12 delineates the plate. In the invention, this grid is made from pure lead or a lead alloy which does not contain antimony. A typical alloy is lead plus .02 to 0.7% calcium. Another is the same alloy with the addition of .02 to .1% tin. Hardening materials known to the trade other than calcium may also be used. Active material 14 fills the void space of the grid. This active material is prepared by the well-known steps of:

(1) Mixing lead oxide—in the case of the invention lead oxide containing a small controlled portion of antimony—with sulfuric acid and water, (2) Smearing the resultant paste into the grid filling the void spaces of the grid, (3) Setting or otherwise stabilizing the paste, (4) Forming the set paste into lead peroxide by the passage of positive current into the plate when the latter is immersed in sulfuric acid.

It has been found that as little as about .005% antimony in the active material can show improved characteristics compared to plates without any antimony present. If the antimony content is too great, some of it will leave the positive plate during the life of the cell and lodge on and poison the negative plates. Therefore, the practical limits for the antimony addition are from about .001% to about 6% of the lead in the lead oxide. An optimum will be found at about .1% to 1%.

The following examples illustrate the practice of the invention.

EXAMPLE I

An alloy of lead and antimony is prepared by adding 30 pounds of antimony to a pot containing 1000 pounds of molten lead. Lead balls, or pigs, are cast from this alloy and fed to a ball mill, or other oxide producing mill, to produce an antimony lead oxide.

Using this lead oxide, a positive paste mix is prepared by mixing 100 pounds of oxide with 4.0 liters of initial water. To this is added, with further mixing, 2.65 liters of 1.400 sp. gr. sulfuric acid and 1.5 liters of final water.

The paste prepared by this method is pasted in lead alloy grids made from an alloy of lead plus 1.5% zinc and 1.5% tin to make positive plates for storage batteries.

EXAMPLE II

An alloy of lead and antimony is prepared by adding 55 pounds of antimony to a pot containing 1000 pounds of molten lead. Lead balls, or pigs, are cast from this alloy and fed to a ball mill, or other oxide producing mill, to produce an antimony lead oxide.

Using this lead oxide, a positive paste mix is prepared by mixing 100 pounds of oxide with 4.0 liters of initial water. To this is added, with further mixing, 2.65 liters of 1.400 sp. gr. sulfuric acid and 1.5 liters of final water.

The paste prepared by this method is pasted in lead alloy grids made from an alloy of lead plus 1.5% zinc and 1.5% tin to make positive plates for storage batteries.

EXAMPLE III

An alloy of lead and antimony is prepared by adding 10 pounds of antimony to a pot containing 1000 pounds of molten lead. Lead balls, or pigs, are cast from this by introducing a stream of air into the lower portion of the pot just above the stirrer therein, feeding molten alloy of the same composition into the pot in a continuous stream in a sufficiently small amount to maintain the contents of the pot at a temperature below the melting point of lead, vigorously agitating the pot contents by periodically dashing them against a large fixed baffle, carrying off the product from the pot through an elongated uptake and during the operation of said pot continuously maintaining a dross of particles of metallic lead and lead oxides in said pot in sufficient amount to provide a medium of dispensing the molten alloy as it is introduced.

Using this lead oxide, a positive paste mix is prepared by mixing 100 pounds of oxide with 4.0 liters of initial water. To this is added, with further mixing 2.65 liters of 1.400 sp. gr. sulfuric acid and 1.5 liters of final water.

The paste prepared by this method is pasted in pure lead grids to make positive plates for storage batteries.

EXAMPLE IV

An alloy of lead and antimony is prepared by adding 20 pounds of antimony to a pot containing 1000 pounds of molten lead. Lead balls, or pigs, are cast from this alloy and fed to a ball mill, or other oxide producing mill, to produce an antimony lead oxide.

Using this lead oxide, a positive paste mix is prepared by mixing 1000 pounds of oxide with 4.0 liters of initial water. To this is added, with further mixing, 2.65 liters of water. To this is added, with further mixing, 2.65 liters of 1.400 sp. gr. sulfuric acid and 1.5 liters of final water.

The paste prepared by this method is pasted in lead alloy grids made from an alloy of lead plus 1.5% zinc and 1.5% tin to make positive plates for storage batteries.

EXAMPLE V

An alloy of lead and antimony is prepared by adding one pound of antimony to a pot containing 1000 pounds of molten lead. Lead balls, or pigs, are cast from this alloy and fed to a ball mill, or other oxide producing mill, to produce an antimony lead oxide.

Using this lead oxide, a positive paste mix is prepared by mixing 100 pounds of oxide with 4.0 liters of initial water. To this is added, with further mixing, 2.65 liters of 1.400 sp. gr. sulfuric acid and 1.5 liters of final water.

The paste prepared by this method is pasted in lead alloy grids made from an alloy of lead plus 1.5% zinc and 1.5% tin to make positive plates for storage batteries.

EXAMPLE VI

An alloy of lead and antimony is prepared by adding $\frac{1}{10}$ pound of antimony to a pot containing 1000 pounds of molten lead. Lead balls, or pigs, are cast from this alloy and fed to a ball mill, or other oxide producing mill, to produce antimony lead oxide. This lead oxide is heated in a reverberatory furnace in the presence of air at 450–500° C. until the desired $Pb_3O_4$ content has been obtained. An 85% grade can be reached in about twenty-four hours. Higher grades require additional time.

Using this lead oxide, a positive paste is prepared by mixing 100 pounds of oxide with 4.0 liters of initial water. To this is added, with further mixing, 2.65 liters of 1.400 sp. gr. sulfuric acid and 1.5 liters of final water.

The paste prepared by this method is pasted in lead alloy grids made from an alloy of lead plus .06% calcium to make positive plates for storage batteries.

Tests.—Batteries were built using plates made according to Examples I and II. The batteries were tested for capacity and then put on life test with results as follows:

| | Positive plate process | Negative plate process | AH at 2.5 amps | Minutes to 6.0 V at 150 a, 0° F. | Life cycles |
|---|---|---|---|---|---|
| Battery No.: | | | | | |
| 1 | Example I | Example I | 57.5 | 2.33 | 396 |
| 2 | Example II | do | 47.6 | 2.28 | 366 |
| 3 | Example I | No antimony in paste | 59.4 | 5.17 | 219 |
| 4 | Example II | do | 36.1 | 3.72 | 140 |
| 5 | No antimony in paste | do | 59.4 | 6.12 | 160 |

The improved cycle life due to the use of oxide in the invention is clearly shown by the performance of batteries 1, 2 and 3.

Having thus described my invention and given examples of its use in actual batteries, I hereby claim:

1. A lead oxide for use in the manufacture of storage battery plates which comprises a mixture consisting of the oxides of lead and antimony, the antimony oxide being molecularly dispersed in the lead and constituting between 0.05% and 5.5% by weight of the lead oxide.

2. A lead oxide as defined in claim 1 in which the antimony oxide is between approximately 0.1% and 1% of the lead oxide.

3. A lead oxide for use in the manufacture of storage battery plates which comprises a mixture consisting of the oxides of lead and antimony, the antimony oxide being molecularly dispersed in the lead by alloying the antimony with the lead prior to the oxidation thereof and constituting between 0.05% and 5.5% by weight of the lead oxide.

4. A lead oxide as defined in claim 3 in which the antimony oxide is between approximately 0.1% and 1% of the lead oxide.

References Cited
UNITED STATES PATENTS

| | | | |
|---|---|---|---|
| 2,820,079 | 1/1958 | Zahn | 136—65 |
| 3,050,577 | 8/1962 | Harris et al. | 136—27 |
| 3,113,020 | 12/1963 | Larsen | 76—166 B X |
| 3,244,562 | 4/1966 | Coppersmith et al. | 136—26 |
| 3,322,496 | 5/1967 | Vahrenkamp et al. | 136—27 |

ANTHONY SKAPARS, Primary Examiner

U.S. Cl. X.R.

136—27